United States Patent

Geshelin et al.

[15] 3,686,491

[45] Aug. 22, 1972

[54] ANALOGUE COMPUTER FOR SOLUTION OF NON-LINEAR BOUNDARY-VALUE PROBLEM

[72] Inventors: Boris Mikhailovich Geshelin; Mikhail Mikhailovich Maximov; Maxim Davidovich Rozenberg; Nadezhda Evgenievna Yakovleva, all of Moscow, U.S.S.R.

[73] Assignee: Vsesojuzny Niftegazovy Nauchno-Issledovatelsky Institut, Moscow, U.S.S.R.

[22] Filed: April 30, 1969

[21] Appl. No.: 820,358

[52] U.S. Cl. ...................235/185, 235/183, 235/197

[51] Int. Cl. ...............................................G06g 7/48

[58] Field of Search...............235/183, 184, 185, 197

[56] References Cited

UNITED STATES PATENTS

| | | | |
|---|---|---|---|
| 3,079,085 | 2/1963 | Clark, Jr. et al. | 235/185 |
| 3,093,731 | 6/1963 | Karplus | 235/185 |
| 3,146,346 | 8/1964 | Evangelisti et al. | 235/185 X |
| 3,250,902 | 5/1966 | Mauchly | 235/185 |

*Primary Examiner*—Charles E. Atkinson

*Attorney*—Waters, Roditi, Schwartz & Nissen

[57] ABSTRACT

An analogue computer for the solution of non-linear boundary-value problems, comprising a controlled-resistor network adapted to simulate parameters of the medium under investigation, and units for setting initial and boundary conditions; connected to the controlled-resistor network are an integrator and a multi-variable non-linear function unit connected to the latter, said multi-variable non-linear function unit being connected with its input to the controlled-resistor network for simulating the non-linear dependence of the parameters of the medium under investigation upon the solution obtained, which perform a continuous re-adjustment of the controlled resistors in the network in order to obtain the solution of the non-linear boundary-value problem in the form of a continuous time function, the unit for setting initial conditions being connected to the input of the integrator.

3 Claims, 2 Drawing Figures

ANALOGUE COMPUTER FOR SOLUTION OF NON-LINEAR BOUNDARY-VALUE PROBLEM

The present invention relates to analogue computers, and more specifically to analogue computers for the solution of non-linear boundary-value problems of mathematical physics, and may be used to handle problems encountered in the petroleum and building industries, electrical engineering, metallurgy, nuclear power, etc.

There exist electrical-network analogue computers for solution of non-linear boundary problems, which depend for their operation on discrete-time simulation. (See "Analogue and analogue-digital computers," Collection of articles, ed. by V.B.Ushakov Issue 1, "Soviet Radio," Moscow, 1968).

In this case, the process of solving a non-linear boundary-value problem is carried out by the analogue computer using the method of successive change of stationary states. The main difficulty in using this method for solving problems lies in the necessity of varying parameters of the medium under investigation by the iterative method in the course of solving the problem from certain functional relations, either manually or by automatizing the process of parameter variation. It is practically impossible to manually solve non-linear boundary-value problems in analogue computers for greater regions, for this requires enormous labor on the part of operators.

An object of the present invention is to provide an analogue computer which, in contrast to existing ones, uses continuous time representation in solution of non-linear boundary-value problems.

The object is accomplished by an analogue computer for solution of non-linear boundary-value problems, comprising a controlled-resistor network to simulate the parameters of the medium under investigation and units to set initial and boundary conditions, in which, according to the invention, the controlled-resistor network is connected to an integrator to which is in turn connected a multi-variable non-linear function unit whose input is coupled to the controlled-resistor network to simulate non-linear relations between the parameters of the medium under investigation and the solution obtained, which continually re-adjusts the controlled-resistor network so that the solution of the non-linear boundary-value problem being handled is yielded as a continuous time function, while the initial-conditions unit is connected to the input of the integrator.

The analogue computer disclosed herein may comprise an additional non-linear unit to simulate physico-chemical interactions between components of the medium being investigated, whose input and output are connected to the integrator, and/or an additional non-linear unit to simulate the elastic forces related to the accumulation of potential energy in the medium being investigated, whose input and output are connected to the controlled-resistor network.

Figure 1:
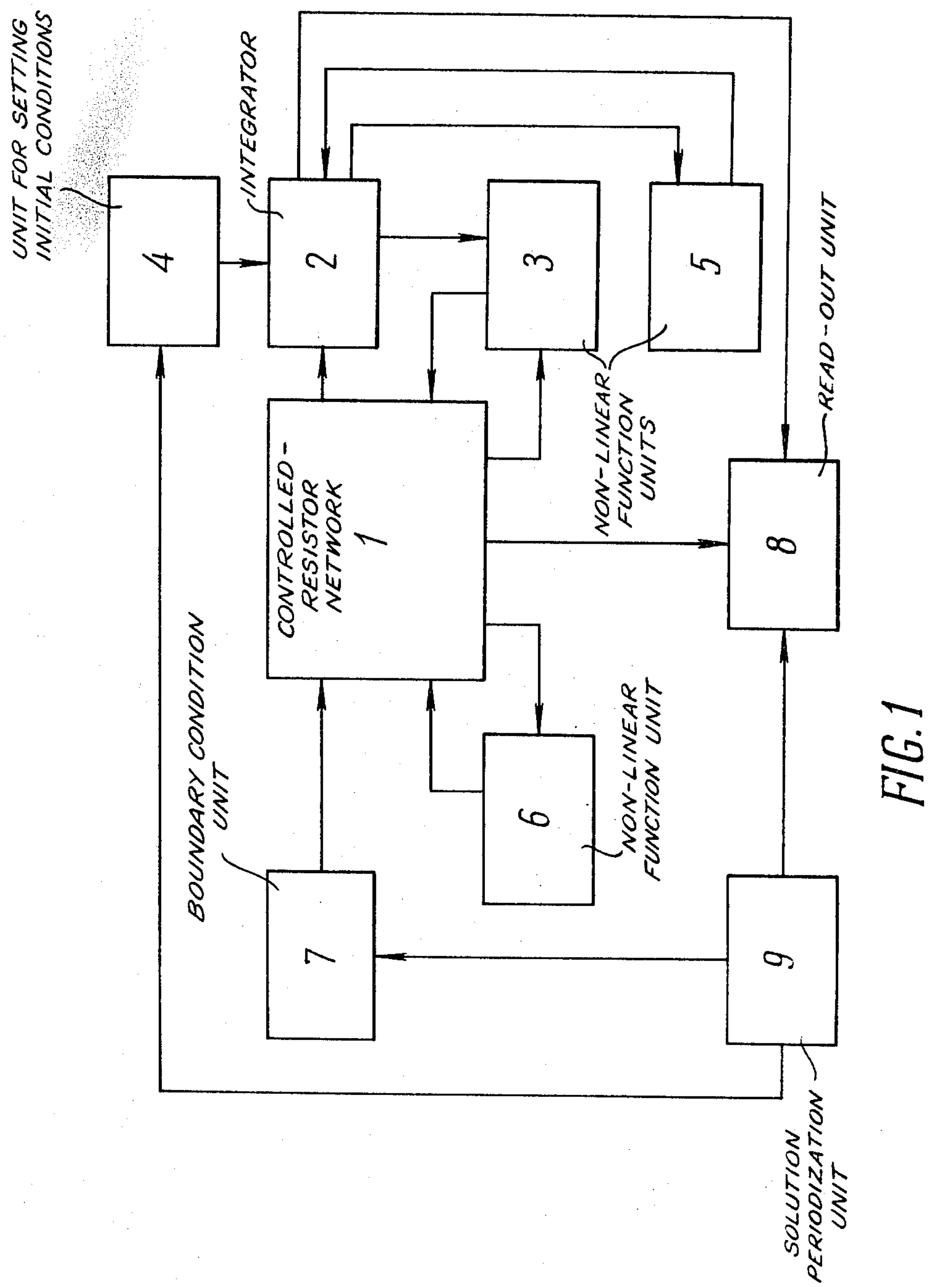
Figure 2:
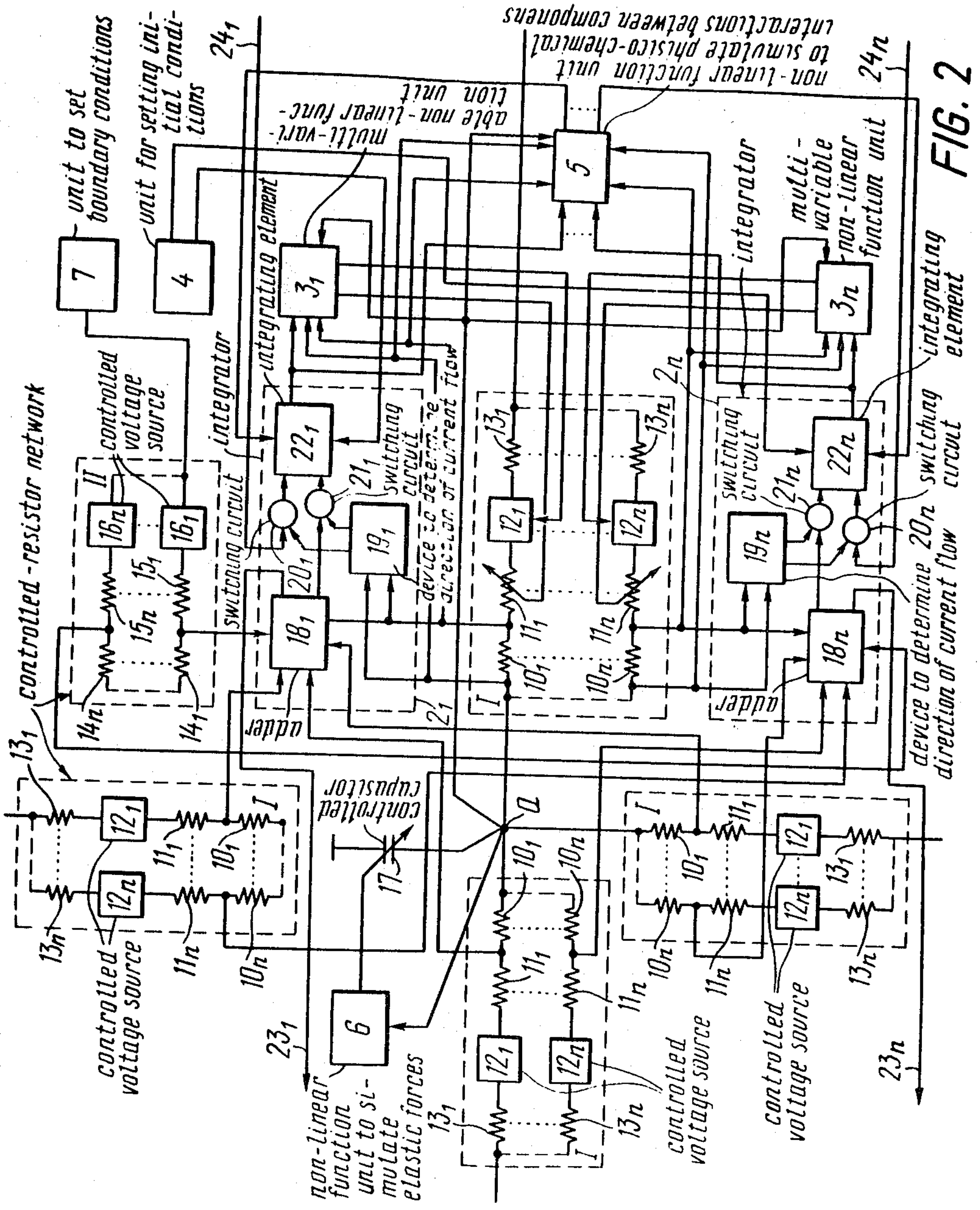

The invention will be best understood from the following description of a preferred embodiment when read in connection with the accompanying drawings in which:

FIG. 1 is a block-diagram of an analogue computer for solution of non-linear boundary-value problems, according to the invention, and FIG. 2 is a block-diagram of the node point "a" in the controlled-resistor network, according to the invention.

Referring now to FIG. 1 of the drawings, to a controlled-resistor network 1, intended to simulate the parameters of the medium under investigation, are connected an integrator 2 and a multi-variable non-linear function unit 3 connected to the integrator and, on its input side, to the network 1 for simulating the non-linear dependence of the parameters of medium under investigation upon the solution obtained. The non-linear function unit 3 effects a continuous re-adjustment of the controlled resistors in the network 1 in order to obtain the solution of the non-linear boundary-value problem in the form of a continuous time function. Connected to the input of the integrator 2 is a unit 4 for setting initial conditions.

To provide for solution of complicated non-linear boundary-value problems, the analogue computer disclosed herein incorporates also a non-linear unit 5 to simulate physico-chemical interactions between the components of the medium under investigation, whose input and output are connected to the integrator 2, and a non-linear unit 6 to simulate the elastic forces related to the accumulation of potential energy in the medium under investigation, whose input and output are connected to the controlled-resistor network 1. The controlled-resistor network 1 is also connected to a boundary-conditions unit 7 intended to simulate the perturbations occuring at the boundaries of the medium under investigation in the form of voltages and currents and some voltage and current functions, using controlled electronic voltage and current stabilizers. The boundary-conditions unit 7 incorporates electronic channels (not shown in the drawing) containing digital-to-analogue converters which make it possible to introduce the functional relations governing changes in the boundary conditions, prepared by a programming facility (not shown in the drawing). A solution to the non-linear boundary-value problem is read out by an automatic read-out unit 8 whose input is connected to the controlled-resistor network 1. The automatic read-out unit 8 comprises a multi-channel measuring device and a controlled commutation switch (not shown in the drawing). The multi-channel device may, for example, incorporate an analogue-to-digital converter and a printer and may be connected by a controlled commutation switch to the integrator 2 and all sub-assemblies of the controlled-resistor network 1 from which a solution is to be read. The automatic read-out unit 8 is controlled by a solution-periodization unit 9. The solution-periodization unit 9 is also connected to the initial-conditions 4 and boundary-conditions 7 units and sets the respective units to a condition corresponding to the commencement of an iteration step. The non-linearity units 3, 5 and 6, the initial-conditions unit 4 and the solution-periodization unit 9 are similar in design to the counterparts in conventional analogue computers.

The controlled-resistor network 1, intended to simulate the parameters of the medium under investigation, contains as many node points as may be necessary for the solution of the problem on hand. Each node point consists of four identical controlled-resistor units I (FIG. 2) or four controlled-resistor units I and one controlled-resistor unit II, if the boundary conditions are introduced at this node point.

The controlled-resistor unit I belonging to the node point "*a*" is formed by *n* parallel branches, where *n* is the number of components present in the medium under investigation, and each branch consists of a series combination of a measuring resistor 10, a controlled resistor 11 a controlled voltage source 12, and a measuring resistor 13.

The controlled-resistor unit II belonging to the node point "*a*" and connected to the boundary-conditions unit 7 is also formed by *n* parallel branches, each of which consists of a parallel combination of a measuring resistor 14, a controlled resistor 15, and a controlled voltage source 16.

The measuring resistor from $\mathbf{10}_1$ through $\mathbf{10}_n$, from $\mathbf{13}_1$ through $\mathbf{13}_n$, and from $\mathbf{14}_1$ through $\mathbf{14}_n$, are intended to determine the magnitude and direction of current in each of the *n* branches in the controlled-resistor units I and II of the resistance network. Provision of two measuring resistors in each branch of controlled-resistor unit I makes possible independent operation of the units belonging to the same node point, which is in this case a common node, that of zero potential.

The controlled voltage sources $\mathbf{12}_1$ through $\mathbf{12}_n$, and $\mathbf{16}_1$ through $\mathbf{16}_n$ are intended to produce self voltage drops across the nodes of the resistance network unit I for each of the *n* branches. The need for this arises, for example, in simulating the flow of two liquids with mutual retardation between them.

In order to simulate the elastic forces related to the accumulation of potential energy in the medium under investigation, at each node point of the resistance-network I is connected a controlled capacitor 17 whose value depends on the voltage appearing at the output of the non-linearity unit 6, this non-linearity being specified for each particular problem as a function of the voltage existing at the node point "*a*" and applied to the non-linearity unit 6.

The integrators $\mathbf{2}_1$ through $\mathbf{2}_n$ incorporate adders $\mathbf{18}_1$ through $\mathbf{18}_n$, devices $\mathbf{19}_1$ through $\mathbf{19}_n$ to determine the direction of current flow in the controlled resistor 1, switching circuits $\mathbf{20}_1$ through $\mathbf{20}_n$ and $\mathbf{21}_1$ through $\mathbf{21}_n$, and integrating elements $\mathbf{22}_1$ through $\mathbf{22}_n$.

The input of the adder $\mathbf{18}_1$ is connected to the measuring resistors $\mathbf{10}_1$ and $\mathbf{14}_1$ belonging to the node point "*a*." The output of the summer $\mathbf{18}_1$ is connected through the switching circuit $\mathbf{21}_1$ to the input of the integrating element $\mathbf{22}_1$, if the current through the controlled-resistor unit I flows out of the node point "*a*." If the current through the controlled-resistor unit I flows into the node point "*a*," the output of the adder $\mathbf{18}_1$ is connected by a conductor $\mathbf{23}_1$ and the switching circuit to the input of the integrating element of the adjacent node point on the left (not shown in the drawing). The input of the adder $\mathbf{18}_n$ is connected to the measuring resistors $\mathbf{10}_n$ and $\mathbf{14}_n$ belonging to the node point "*a*." The output of the adder $\mathbf{18}_n$ is connected to either the input of the integrating element $\mathbf{22}_n$ through the switching circuit $\mathbf{21}_n$, if the current through the controlled-resistor unit I flows from the node point "*a*," or by the conductor $\mathbf{23}_n$ to the input of the integrating element through the switching circuit of the adjacent node point to the left (not shown in the drawing) if the current through the controlled-resistor unit I flows into the node point "*a*."

The switching circuits $\mathbf{20}_1$ through $\mathbf{20}_n$ and $\mathbf{21}_1$ through $\mathbf{21}_n$ are connected to the outputs of the respective devices $\mathbf{19}_1$ through $\mathbf{19}_n$ whose inputs are connected to the measuring resistors $\mathbf{10}_1$ through $\mathbf{10}_n$ and which determine the direction of current flow in the controlled-resistor unit I. In order to introduce initial conditions in the form of voltages, the integrating elements $\mathbf{22}_1$ through $\mathbf{22}_n$ are connected to the initial-conditions unit 4. The outputs of the integrating elements $\mathbf{22}_1$ through $\mathbf{22}_n$ are connected to the non-linearity unit 5 to simulate physico-chemical interactions between the components present in the medium under investigation. Furthermore, the non-linearity unit 5 is connected to the measuring resistors $\mathbf{10}_1$ through $\mathbf{10}_n$ and to the node point "a." The outputs of the non-linearity unit 5 are connected to the inputs of the integrating elements $\mathbf{22}_1$ through $\mathbf{22}_n$ to control the voltages at the output of the latter. The outputs of the integrating elements $\mathbf{22}_1$ through $\mathbf{22}_n$ are connected to the inputs of the multi-variable non-linear function units $\mathbf{3}_1$ through $\mathbf{3}_n$, which are also connected to the measuring resistors $\mathbf{10}_1$ through $\mathbf{10}_n$ and the node point "a."

The outputs of the multi-variable non-linear function units $\mathbf{3}_1$ through $\mathbf{3}_n$ are connected to the controlled resistors $\mathbf{11}_1$ through $\mathbf{11}_n$ and the controlled voltage sources $\mathbf{12}_1$ through $\mathbf{12}_n$. In the above, the non-linear function units 3, 5 and 6 are essentially single-or multi-variable non-linear function units, which have the form of a diode functional generator usually used in computer technology and described, for example, in Electric Analog and Hybrid Computers, by G. A. Korn J. M. Korn, McGraw-Hill, New York, 1964.

The solution periodizing unit 9 is an auxiliary device usually employed in analogue computers with iteration and described, for example, in High-Speed Analog Computers, by R. Tomovic, W. J. Karplus, John Wiley & Sons, New York, 1962.

The operation of the analogue computer, disclosed herein, can be considered as applied to non-linear boundary-value problems encountered in the development of oil and oil-gas deposits, and more specifically to the flow of oil and gas having complex physico-chemical composition in a porous medium. This is a non-linear boundary-value problem in partial derivatives. The properties of the continuous medium and of the oil and gas filling it are deemed to be known at each point of the medium at the initial instant of time, thus constituting the initial conditions of the problem, while the boundary conditions are the conditions of development at the boundaries of the producing medium.

The procedure involves two steps: a problem set-up and a problem solution.

During the first step, the continuous medium is broken down into elementary volumes each of which is then simulated by controlled-resistor units I. The upper and lower limits for the excursions of the values of the resistors $\mathbf{11}_1$ through $\mathbf{11}_n$ and $\mathbf{15}_1$ through $\mathbf{15}_n$, the controlled capacitors 17, and controlled voltage sources $\mathbf{12}_1$ through $\mathbf{12}_n$ and $\mathbf{16}_1$ through $\mathbf{16}_n$ are established in accordance with the specified properties of the porous medium within each volume and the properties of oil and gas flows, and also in accordance with the desired time of solution. The values of the measuring resistors $\mathbf{10}_1$ through $\mathbf{10}_n$, $\mathbf{13}_1$ through $\mathbf{13}_n$ and $\mathbf{14}_1$ through $\mathbf{14}_n$ are selected so that they are much lower than the lower limit of the controlled resistors $11_1$ through $11_n$ and $15_1$ through $15_n$ and cannot introduce errors in the computed values of the controlled resistors $11_1$ through $11_n$ and $15_1$ through $15_n$.

In accordance with the determined limits on the excursions of the controlled resistors $11_1$ through $11_n$ and $15_1$ through $15_n$ and the controlled capacitors 17, the requisite connections are made on the resistance network I. In the multi-variable non-linear function units $3_1$ through $3_n$ the specified functions are selected, governing variations in the value of the controlled resistors $11_1$ through $11_n$ and the controlled voltage sources $12_1$ through $12_n$ of the resistance network I. The non-linearity unit 5, intended to simulate physico-chemical interactions between components moving in a continuous medium, is set up in accordance with the properties of these components. The non-linearity unit 6, intended to simulate the elastic forces related to the accumulation of potential energy in the medium under investigation, is set up in accordance with the specified non-linear relation between the values of the controlled capacitors 17 and the node voltages of the resistance network I. In accordance with the specified initial distribution of the properties of oil and gas in the medium, the initial conditions unit 4 is set up to furnish the requisite voltages which are then fed to the integrator 2. The voltages appearing at the outputs of the integrator 2 go to the multi-variable non-linear function unit 3 and the non-linearity unit 5 intended to simulate physico-chemical interactions between the components present in the medium under investigation, and are converted in accordance with the non-linear functions set up on those units, into voltages which bring the controlled resistors $11_1$ through $11_n$ and the controlled voltage sources $12_1$ through $12_n$ in the resistance network I to conditions corresponding to the start of the problem. In the boundary-conditions unit 7, time functions of currents and voltages are set up in accordance with the conditions of oil-field development. This completes the set-up stage of the procedure.

The instant of time at which the boundary conditions are set up on the resistance network I defines the start of the problem. The currents flowing in the controlled resistors $11_1$ through $11_n$ and $15_1$ through $15_n$ of the resistance network I produce voltages at its node points. Acting upon the non-linearity unit 6, these voltages are converted by that unit in accordance with the non-linearity selected for the problem on hand into the voltages determining the capacitance of the controlled capacitors 17 at the node points of the resistance network I.

The operation is next considered of the units associated with the first branch in the controlled-resistor unit I, belonging to the node point "$a$" (FIG. 2). The current flowing in the controlled resistor 11 produces across the measuring resistor $10_1$ a voltage drop which is applied to the adder $18_1$ and the device $19_1$ determining the direction of current flow. If the current through the controlled resistor $11_1$ flows out of the node point "$a$," the voltage drop produced across the resistor $10_1$ is negative, and, on being applied to the device $19_1$, gives rise to a voltage at the output connected to the switching circuit $21_1$. The switching circuit $21_1$ opens, and the voltage from the output of the adder $18_1$ goes through the switching circuit $21_1$ opened by the device $19_1$ to the input of the integrating element $22_1$. If the current through the controlled resistor $11_1$ flows into the node point "$a$," a positive voltage drop is produced across the measuring resistor $10_1$, which, on being applied to the device $19_1$, produces a voltage at the output connected to the switching circuit $20_1$. The switching circuit $20_1$ opens, and the voltage from the output of the adder belonging to the adjacent node point to the right (not shown in the drawing) is conveyed by the conductor $24_1$, and through the switching circuit $20_1$ opened by the device $19_1$ to the input of the integrating element $22_1$. The voltage applied to the input of the integrating element $22_1$ brings about a change in the voltage at its output.

The new value of voltage at the output of the integrating element $22_1$ is applied to the non-linearity unit 5 simultaneously with the voltage at the node point "$a$" and the voltage taken from across the measuring resistor $10_1$. Applied to the non-linearity unit 5, these voltages are converted in accordance with the non-linearity set up on it for the problem on hand and are applied to the input of the integrating element $22_1$, thereby controlling the voltage at its output. From the output of the integrating element $22_1$ the voltage varying in accordance with the non-linear relation set up on the non-linearity unit 5 is fed to the multi-variable non-linear function unit $3_1$ whose input also accepts the voltage from across the measuring resistor $10_1$ and the voltage at the node point "$a$." The voltages applied to the multi-variable non-linear function unit $3_1$ are converted in accordance with the non-linearity selected for the problem on hand into voltages which vary the value of the controlled resistor $11_1$ and the voltage at the output of the controlled voltage source $12_1$.

The foregoing fully applies to any branch of the controlled-resistor unit I at any node point of the resistance network I.

The changed values of the controlled resistors $11_1$ through $11_n$ and the changed voltages at the output of the controlled voltage sources $12_1$ through $12_n$ bring about a redistribution of voltages at the node points of the resistance network I, which in turn causes changes in the currents flowing in the controlled resistors $11_1$ through $11_n$. From that instant on, the units interact electrically as already described.

Thus, the analogue computer disclosed herein yields a solution to a problem in the form of continually varying voltages at the node points of the resistance network I, which correspond to variations in the pressure field in the horizon being investigated, and continually varying voltages at the outputs of the integrators $2_1$ through $2_n$, which correspond to the quantitative content of the components in the oil-gas mixture filling the volume simulated by each node point of the resistance network.

The invention has broad functional potentialities and can handle a great variety of non-linear boundary-value problems, including problems having no rigorous analytical solution, such as problems involving multifold connected regions with complicated contours.

The analogue computer disclosed herein is especially advantageous in the simulation of complicated non-stationary problems involving non-homogeneous parameters continually varying in time and space and a large number of complex boundary conditions, and also perturbation problems.

The invention can find many uses in fundamental and applied research in many industries, above all in the petroleum industry, since the problems related to the monitoring, analysis and control of oil-field development are reduced to problems of filtration of multi-component and multi-phase mixes in a porous medium, in the presence of thermal, chemical and other factors, that is, to non-linear problems in partial derivatives.

A major advantage of the invention is that solutions are yielded as continuous time functions, so that there is no need for iteration. This guarantees stability and convergence of the solution and materially simplifies and speeds up the solving of non-linear boundary-value problems.

Although the present invention has been described in connection with a preferred embodiment thereof, it should be understood that various modifications and adaptations may be made which do not constitute departures from the spirit and scope of the invention, which those skilled in the art will readily comprehend.

Such modifications and adaptations should and are intended to be comprehended within the meaning and range of equivalence of the invention as set forth in the appended claims.

What is claimed is:

1. An analogue computer for the solution of non-linear boundary-value problems, comprising: a controlled-resistor network adapted to simulate the parameters of a medium under investigation; first means adapted to introduce initial conditions; second means adapted to introduce boundary conditions and connected to feed an output to said controlled-resistor network; an integrator unit connected to receive an input from said controlled-resistor network and from said first means; a multi-variable non-linear function unit connected to receive an input from said integrator unit and having an input and output connected to said controlled-resistor network to obtain the solution of a non-linear boundary-value problem in the form of continuously varying voltages at the node points of said network which corresponds to variations in the pressure field in the object under investigation, and continuously varying voltages at the output of said integrator unit corresponding to the quantitative content of components being filtered for the volume corresponding to each node point of the controlled-resistor network.

2. An analogue computer as claimed in claim 1, comprising an additional non-linear function unit having an input and output connected to said integrator unit and adapted to simulate the transition of the components being filtered to another aggregate state and chemical interaction of the components being filtered.

3. An analogue computer as claimed in claim 1, comprising an additional non-linear function unit having an input and output connected to said controlled-resistor network and adapted to simulate the compressibility of the components being filtered as a result of pressure.

* * * * *

UNITED STATES PATENT OFFICE
CERTIFICATE OF CORRECTION

Patent No. 3,686,491 Dated August 22, 1972

Inventor(s) Boris Mikhailovich Geshelin et al

It is certified that error appears in the above-identified patent and that said Letters Patent are hereby corrected as shown below:

On the cover sheet [73] the name of the assignee should read -- Vsesojuzny Neftegazovy Nauchno-Issledovatelsky Institut --.

Signed and sealed this 1st day of May 1973.

(SEAL)
Attest:

EDWARD M.FLETCHER,JR.
Attesting Officer

ROBERT GOTTSCHALK
Commissioner of Patents